United States Patent [19]

Richeson et al.

[11] Patent Number: 5,891,814
[45] Date of Patent: *Apr. 6, 1999

[54] NONWOVEN FABRICS

[75] Inventors: Galen C. Richeson, Kingwood; Glenn A. Stahl, Humble; James J. McAlpin, Houston; Anthony N. Speca, Kingwood, all of Tex.

[73] Assignee: Exxon Chemical Patents Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 800,436

[22] Filed: Feb. 18, 1997

Related U.S. Application Data

[63] Continuation of Ser. No. 164,520, Dec. 9, 1993, abandoned, which is a continuation of Ser. No. 66,737, May 25, 1993, abandoned.

[60] Provisional application Nos. 60/012,185, Feb. 23, 1996 and 60/032,710, Dec. 13, 1996.

[51] Int. Cl.$^6$ ....................................................... D04H 1/56
[52] U.S. Cl. ............................................. 442/401; 526/351
[58] Field of Search ............................. 526/351; 442/401

[56] References Cited

U.S. PATENT DOCUMENTS

| | | | |
|---|---|---|---|
| 5,145,819 | 9/1992 | Winter et al. | 502/117 |
| 5,252,529 | 10/1993 | Ueda et al. | |
| 5,332,706 | 7/1994 | Nowlin et al. | |
| 5,637,666 | 6/1997 | Winter et al. | 526/351 |

FOREIGN PATENT DOCUMENTS

| | | |
|---|---|---|
| 2133181 | 9/1994 | Canada . |
| 516458 A2 | 12/1992 | European Pat. Off. . |
| 310734 B1 | 11/1994 | European Pat. Off. . |
| 9428219 | 12/1994 | WIPO . |
| 95/12622 | 5/1995 | WIPO . |

*Primary Examiner*—James J. Bell
*Attorney, Agent, or Firm*—Paige Schmidt

[57] ABSTRACT

This invention relates to improved polypropylene nonwoven fabrics. The fabrics are made from isotactic polypropylene which has been produced with a catalyst systems comprising at least two metallocenes. These nonwoven fabrics, particularly when prepared using a spunbonding process, exhibit significantly improved strength without significant sacrifice of other favorable properties.

11 Claims, No Drawings

NONWOVEN FABRICS

The application is based on provisional application Ser. No. 60/012,185, filed Feb. 23, 1996, and provisional application Ser. No. 60/032,710, filed Dec. 13, 1996, and a continuation of U.S. patent application Ser. No. 08/066,737, filed May 25, 1993, which is a continuation of U.S. patent application Ser. No. 08/164,520, filed Dec. 9, 1993, now abandoned.

FIELD OF THE INVENTION

This invention relates to improved polypropylene nonwoven fabrics. The fabrics comprise isotactic polypropylene which has been produced with a catalyst system comprising at least two metallocenes. These nonwoven fabrics, particularly when prepared using a spunbonding process, exhibit significantly improved strength without significant sacrifice of other favorable properties.

BACKGROUND

The new generation of metallocene catalyzed polymers is expected to have profound effects on the polyolefin industry. Polyolefin resins produced by metallocene catalysts in general have a number of improved properties as compared to conventional polymers produced with Ziegler-Natta catalysts. As more and more product manufacturers begin utilizing metallocene produced polymers, various areas for polymer improvement will become apparent. Currently, polymer producers may choose from a variety of techniques to manipulate the polymer such as post reactor polymer degradation, blending, change of catalyst, use of additives and varying the polymerization conditions.

Metallocene catalyzed propylene polymers are among the newest metallocene produced polymers now commercially available. One major product area for these new polymers is in nonwoven fabrics. The metallocene produced propylene polymers have a number of advantages over conventional polymers. For example, these polymers have a narrow molecular weight distribution which enable significantly higher spinning speeds and finer denier fibers. In addition, due to their unique molecular architecture, these polymers have an extractable level that is less than one third that of conventional polymers.

In an effort to improve the strength of fabrics made from metallocene produced polypropylene, the present inventors sought to manipulate the polymer tacticity distribution. It was hypothesized that broadening the tacticity distribution of the propylene polymer would result in a broadened bonding window and higher strength fabric. The present inventors have found that the tacticity distribution of isotactic polypropylene can be broadened by making the polymer with at least two different metallocenes, provided that two or more metallocenes are chosen that produce polymer having different tacticities.

It is known in the art to use two metallocenes to make polymer having broadened molecular weight distribution. EP 0 310 734, for example discloses the use of at least two different metallocene catalysts which are chiral and stereorigid in combination with an aluminum compound to produce polymer having a broad molecular weight distribution. EP 645 401 also describes the use of at least two stereorigid metallocenes, of which at least one has substituted indenyl ligands. These catalysts produce high molecular weight isotactic polypropylene having a broad molecular weight distribution.

WO 94/28034 describes supported metallocene catalyst systems containing one metallocene. These metallocenes have high activity and are capable of producing high molecular weight isotactic polypropylene without fouling the reactor. The catalyst system is prepared by premixing the metallocene and alumoxane activator then combining the reaction product with support material.

Thus the prior art teaches that high molecular weight, isotactic polypropylene may be produced with supported metallocene catalyst systems. The prior art further teaches the preparation of high molecular weight istotactic polypropylene having a broad molecular weight distribution using two or more stereorigid metallocenes, of which at least one has substituted indenyl ligands. The prior art, however, does not address the problems that may occur in nonwoven fabrics prepared with polymers having narrow tacticity distribution.

Nonwoven polypropylene fabrics are well known. Nonwoven fabrics or webs may be formed by a variety of processes such as melt blowing, spunbonding, film aperturing, and staple fiber carding. They are used to make many types of products including garments such as work wear, medical garb, and absorbent articles such as diapers. Processes for making nonwoven fabrics generally involve meltspinning thermoplastic material, drawing the filaments using pneumatic means, and collecting the drawn filaments randomly on a conveyor belt and heating the web to cause the filaments to soften and fuse together. The following patents disclose various meltspinning techniques and are herein incorporated by reference: U.S. Pat. Nos. 4,692,618; 4,692,106; 4,405,297; 4,340,563; 3,692,618; 3,338,992, 3,341,394; 3,502,538; 3,502,763; 3,909,009; and 3,542,615. To the extent that these references are directed to polypropylene fabrics, they are limited to polypropylenes produced with traditional Ziegler-Natta catalysts. The fabrics made from these polymers, therefore, do not share the same attributes as fabrics prepared with single sited, metallocene produced polypropylene.

EP 600 461 and WO 9 482 219 disclose nonwoven fabrics prepared with polypropylene produced with catalyst systems having a single metallocene. The isotactic polypropylene produced from these catalyst systems, therefore, has very narrow molecular weight and tacticity distributions. The fabrics made with metallocene produced polypropylene exhibit improvements in properties such as improved web uniformity, finer fibers and better coverage which typically lead to improved softness and liquid barrier capability when compared to fabrics made with Ziegler-Natta produced polypropylene.

The present inventors have found that polypropylene nonwoven fabric strength is improved by preparing the fabric with polymer comprising polypropylene produced with a catalyst system having at least two metallocenes.

SUMMARY

This invention relates to nonwoven fabrics comprising polymeric strands comprising a polymeric component comprising polypropylene having at least 30% isotactic pentads wherein the polypropylene has been produced with a catalyst system comprising two metallocenes at least one of which is represented by the formula:

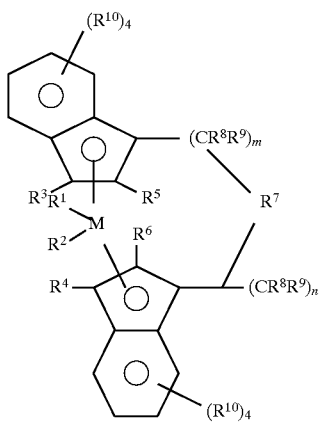

wherein M is selected from the group consisting of titanium, zirconium, hafnium, vanadium niobium, tantalum, chromium, molybdenum and tungsten;

$R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

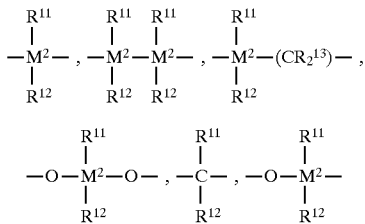

—$B(R^{11})$, —$Al(R^{11})$—, —Ge—, —Sn—, —O—, —S—, —SO—, —$SO_2$—, —$N(R^{11})$—, —CO—, —$P(R^{11})$—, or —$P(O)(R^{11})$; wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals can be joined together to form a ring system.

DETAILED DESCRIPTION

The nonwoven fabrics of this invention are made with mixed metallocene isotactic polypropylene which is optionally blended with other polymers, preferably either mixed metallocene isotactic polypropylene or single metallocene isotactic polypropylene.

Catalyst System Components

Metallocenes

As used herein "metallocene" refers generally to compounds represented by the formula $Cp_mMR_nX_q$ wherein $C_p$ is a cyclopentadienyl ring which may be substituted or derivative thereof which may be substituted, M is a Group 4, 5, or 6 transition metal, for example titanium, zirconium, hafnium, vanadium, niobium, tantalum, chromium, molybdenum and tungsten, R is a hydrocarbyl group or hydrocarboxy group having from one to 20 carbon atoms, X is a halogen, and m=1–3, n=0–3, q=0–3, and the sum of m+n+q is equal to the oxidation state of the transition metal.

Methods for making and using metallocenes are very well known in the art. For example, metallocenes are discussed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790 each fully incorporated herein by reference.

For the preparation of isotactic polypropylene the preferred metallocenes are those represented by the formula I:

in which M' is a Group 4, 5, or 6 transition metal, preferably zirconium; X' and X" are the same or different hydride, halogen, preferably Cl, hydrocarbyl or alkyl radical having up to about 6 carbon atoms; A' and A" are the same or different asymmetrical hydrocarbyl, preferably a substituted cyclopentadienyl group, even more preferably an indenyl group or substituted indenyl group; and S' is a linear or cyclic radical bridge of from one to six atoms. Preferably the bridge contains a silicon atom that is disubstituted with alkyl groups. Specific examples of these chiral, bridged metallocenes include but are not limited to racemic: dimethylsilanediylbis(3-methylcyclopentadienyl) $ZrCl_2$; dimethylsilanediylbis(indenyl) $ZrCl_2$; dimethylsilanediylbis (4,5,6,7-tetrahydroindenyl) $ZrCl_2$; [1,1'-(1,1,2,2-tetramethylsilanediyl)bis(3-methylcyclopentadienyl)] $ZrCl_2$; [1,1'-(1,1,2,2-tetramethylsilanediyl)bis(4,5,6,7-tetrahydroindenyl) $ZrCl_2$;

Methods for preparing and using these types of metallocenes are well known. These metallocenes are discussed extensively in U.S. Pat. Nos. 4,769,510; 4,933,403; 5,120,867; and 5,314,973; each fully incorporated herein by reference.

For the preparation of highly isotactic, high molecular weight polypropylene, preferred metallocenes are those represented by the following formula II:

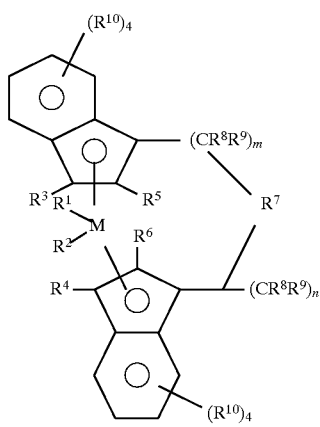

wherein M is a metal of Group 4, 5, or 6 of the Periodic Table preferably, zirconium, hafnium and titanium, most preferably zirconium;

$R^1$ and $R^2$ are identical or different, are one of a hydrogen atom, a $C_1-C_{10}$ alkyl group, preferably a $C_1-C_3$ alkyl group, a $C_1-C_{10}$ alkoxy group, preferably a $C_1-C_3$ alkoxy group, a $C_6-C_{10}$ aryl group, preferably a $C_6-C_8$ aryl group, a $C_6-C_{10}$ aryloxy group, preferably a $C_6-C_8$ aryloxy group, a $C_2-C_{10}$ alkenyl group, preferably a $C_2-C_4$ alkenyl group, a $C_7-C_{40}$ arylalkyl group, preferably a $C_7-C_{10}$ arylalkyl group, a $C_7-C_{40}$ alkylaryl group, preferably a $C_7-C_{12}$ alkylaryl group, a $C_8-C_{40}$ arylalkenyl group, preferably a $C_8-C_{12}$ arylalkenyl group, or a halogen atom, preferably chlorine;

$R^3$ and $R^4$ are hydrogen atoms;

$R^5$ and $R^6$ are identical or different, preferably identical, are one of a halogen atom, preferably a fluorine, chlorine or bromine atom, a $C_1-C_{10}$ alkyl group, preferably a $C_1-C_4$ alkyl group, which may be halogenated, a $C_6-C_{10}$ aryl group, which may be halogenated, preferably a $C_6-C_8$ aryl group, a $C_2-C_{10}$ alkenyl group, preferably a $C_2-C_4$ alkenyl group, a $C_7-C_{40}$ -arylalkyl group, preferably a $C_7-C_{10}$ arylalkyl group, a $C_7-C_{40}$ alkylaryl group, preferably a $C_7-C_{12}$ alkylaryl group, a $C_8-C_{40}$ arylalkenyl group, preferably a $C_8-C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1-C_{10}$ alkyl group, preferably a $C_1-C_3$ alkyl group, or a $C_6-C_{10}$ aryl group, preferably a $C_6-C_9$ aryl group;

$R^7$ is

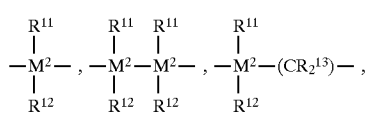

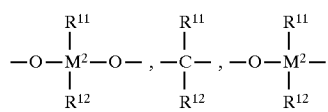

—$B(R^{11})$—, —$Al(R^{11})$—, —Ge—, —Sn—, —O—, —S—, —SO—, —$SO_2$—, —$N(R^{11})$—, —CO—, —$P(R^{11})$—, or —$P(O)(R^{11})$—;

wherein:

$R^{11}$, $R^{12}$ and $R^{13}$ are identical or different and are a hydrogen atom, a halogen atom, a $C_1-C_{20}$ alkyl group, preferably a $C_1-C_{10}$ alkyl group, a $C_1-C_{20}$ fluoroalkyl group, preferably a $C_1-C_{10}$ fluoroalkyl group, a $C_6-C_{30}$ aryl group, preferably a $C_6-C_{20}$ aryl group, a $C_6-C_{30}$ fluoroaryl group, preferably a $C_6-C_{20}$ fluoroaryl group, a $C_1-C_{20}$ alkoxy group, preferably a $C_1-C_{10}$ alkoxy group, a $C_2-C_{20}$ alkenyl group, preferably a $C_2-C_{10}$ alkenyl group, a $C_7-C_{40}$ arylalkyl group, preferably a $C_7-C_{20}$ arylalkyl group, a $C_8-C_{40}$ arylalkenyl group, preferably a $C_8-C_{22}$ arylalkenyl group, a $C_7-C_{40}$ alkylaryl group, preferably a $C_7-C_{20}$ alkylaryl group or $R^{11}$ and $R^{12}$, or $R^{11}$ and $R^{13}$, together with the atoms binding them, can form ring systems;

$M^2$ is silicon, germanium or tin, preferably silicon or germanium, most preferably silicon;

$R^8$ and $R^9$ are identical or different and have the meanings stated for $R^{11}$;

m and n are identical or different and are zero, 1 or 2, preferably zero or 1, m plus n being zero, 1 or 2, preferably zero or 1; and the radicals $R^{10}$ are identical or different and have the meanings stated for $R^{11}$, $R^{12}$ and $R^{13}$. Two adjacent $R^{10}$ radicals can be joined together to form a ring system, preferably a ring system containing from about 4–6 carbon atoms.

Alkyl refers to straight or branched chain substituents. Halogen (halogenated) is fluorine, chlorine, bromine or iodine atoms, preferably fluorine or chlorine.

Particularly preferred metallocenes are compounds of the structures:

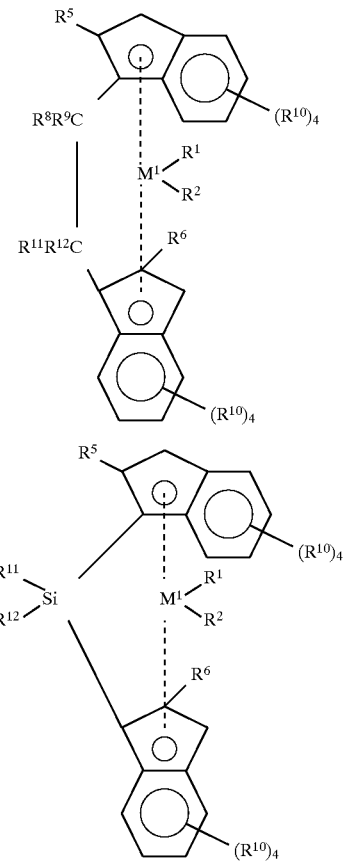

wherein:

$M^1$ is Zr or Hf, $R^1$ and $R^2$ are methyl or chlorine, and $R^5$, $R^6$ $R^8$, $R^9$, $R^{10}$, $R^{11}$ and $R^{12}$ have the above-mentioned meanings.

These chiral metallocenes may be used as a racemate for the preparation of highly isotactic polypropylene copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Generally, these metallocenes are prepared by a multi-step process involving repeated deprotonations/metallations of the aromatic ligands and introduction of the bridge and the central atom by their halogen derivatives. The following reaction scheme illustrates this generic approach:

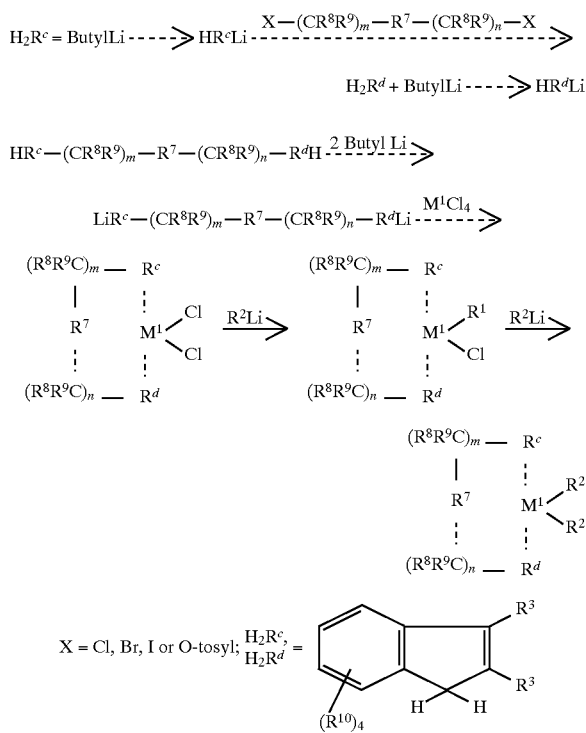

Additional methods for preparing metallocenes are fully described in the *Journal of Organometallic Chem.*, volume 288, (1985), pages 63–67, and in EP-A-320762, for preparation of the metallocenes described, both of which are herein fully incorporated by reference.

Illustrative but non-limiting examples of these metallocenes include:
Dimethylsilandiylbis(2-methyl-4-phenyl-1-indenyl)ZrCl$_2$
Dimethylsilandiylbis(2-methyl-4,5-benzoindenyl)ZrCl$_2$;
Dimethylsilandiylbis(2-methyl-4,6-diisopropylindenyl)ZrCl$_2$;
Dimethylsilandiylbis(2-ethyl-4-phenyl-1-indenyl)ZrCl$_2$;
Dimethylsilandiylbis(2-ethyl-4-naphthyl-1-indenyl)ZrCl$_2$,
Phenyl(Methyl)silandiylbis(2-methyl-4-phenyl-1-indenyl)ZrCl$_2$,
Dimethylsilandiylbis(2-methyl-4-(1-naphthyl)-1-indenyl)ZrCl$_2$,
Dimethylsilandiylbis(2-methyl-4-(2-naphthyl)-1-indenyl)ZrCl$_2$,
Dimethylsilandiylbis(2-methyl-indenyl)ZrCl$_2$,
Dimethylsilandiylbis(2-methyl-4,5-diisopropyl-1-indenyl)ZrCl$_2$,
Dimethylsilandiylbis(2,4,6-trimethyl-1-indenyl)ZrCl$_2$,
Phenyl(Methyl)silandiylbis(2-methyl-4,6-diisopropyl-1-indenyl)ZrCl$_2$,
1,2-Ethandiylbis(2-methyl-4,6-diisopropyl-1-indenyl)ZrCl$_2$,
1,2-Butandiylbis(2-methyl-4,6-diisopropyl-1-indenyl)ZrCl$_2$,
Dimethylsilandiylbis(2-methyl-4-ethyl-1-indenyl)ZrCl$_2$,
Dimethylsilandiylbis(2-methyl-4-isopropyl-1-indenyl)ZrCl$_2$,
Dimethylsilandiylbis(2-methyl-4-t-butyl-1-indenyl)ZrCl$_2$,
Phenyl(Methyl)silandiylbis(2-methyl-4-isopropyl-1-indenyl)ZrCl$_2$,
Dimethylsilandiylbis(2-ethyl-4-methyl-1-indenyl)ZrCl$_2$,
Dimethylsilandiylbis(2,4-dimethyl-1-indenyl)ZrCl$_2$,
Dimethylsilandiylbis(2-methyl-4-ethyl-1-indenyl)ZrCl$_2$,
Dimethylsilandiylbis(2-methyl-α-acenaphth-1-indenyl)ZrCl$_2$,
Phenyl(Methyl)silandiylbis(2-methyl-4,5-benzo-1-indenyl)ZrCl$_2$,
Phenyl(Methyl)silandiylbis(2-methyl-4,5-(methylbenzo)-1-indenyl)ZrCl$_2$,
Phenyl(Methyl)silandiylbis(2-methyl-4,5-(tetramethylbenzo)-1-indenyl)ZrCl$_2$,
Phenyl(Methyl)silandiylbis(2-methyl-α-acenaphth-1-indenyl)ZrCl$_2$,
1,2-Ethandiylbis(2-methyl-4,5-benzo-1-indenyl)ZrCl$_2$,
1,2-Butandiylbis(2-methyl-4,5-benzo-1-indenyl)ZrCl$_2$,
Dimethylsilandiylbis(2-methyl-4,5-benzo-1-indenyl)ZrCl$_2$,
1,2-Ethandiylbis(2,4,7-trimethyl-1-indenyl)ZrCl$_2$,
Dimethylsilandiylbis(2-methyl-1-indenyl)ZrCl$_2$,
1,2-Ethandiylbis(2-methyl-1-indenyl)ZrCl$_2$,
Phenyl(Methyl)silandiylbis(2-methyl-1-indenyl)ZrCl$_2$,
Diphenylsilandiylbis(2-methyl-1-indenyl)ZrCl$_2$,
1,2-Butandiylbis(2-methyl-1-indenyl)ZrCl$_2$,
Dimethylsilandiylbis(2-ethyl-1-indenyl)ZrCl$_2$,
Dimethylsilandiylbis(2-methyl-5-isobutyl-1-indenyl)ZrCl$_2$,
Phenyl(Methyl)silandiylbis(2-methyl-5-isobutyl-1-indenyl)ZrCl$_2$,
Dimethylsilandiylbis(2-methyl-5-t-butyl-1-indenyl)ZrCl$_2$,
Dimethylsilandiylbis(2,5,6-trimethyl-1-indenyl)ZrCl$_2$, and the like.

These preferred metallocene catalyst components are described in detail in U.S. Pat. Nos. 5,145,819; 5,243,001; 5,239,022; 5,329,033; 5,296,434; 5,276,208; and 5,374,752; and EP 549 900 and 576 970 all of which are herein fully incorporated by reference.

Activators

Metallocenes are generally used in combination with some form of activator in order to create an active catalyst system. The term "activator" is defined herein to be any compound or component capable of enhancing the ability of one or more metallocenes to polymerize olefins to polyolefins. Alklyalumoxanes are preferably used as activators, most preferably methylalumoxane (MAO). Generally alkylalumoxanes contain about 5 to 40 of the repeating units:

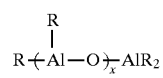

for linear species and

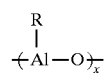

for cyclic species where R is a $C_1$–$C_8$ alkyl including mixed alkyls. Particularly preferred are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. No. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each fully incorporated herein by reference.

Some MAO solutions tend to become cloudy and gelatinous over time. It may be advantageous to clarify such solutions prior to use. A number of methods are used to create gel-free MAO solutions or to remove gels from the solutions. Gelled solutions are often simply filtered or decanted to separate the gels from the clear MAO. U.S. Pat. No. 5,157,137 discloses a process for forming clear, gel-free solutions of alkylalumoxane by treating a solution of alkylalumoxane with an anhydrous salt and/or hydride of an alkali or alkaline earth metal.

Ionizing activators may also be used with metallocenes. Ionizing activators may be neutral or ionic, or compounds such as tri(n-butyl)ammonium tetrakis(pentaflurophenyl) boron, which ionize the neutral metallocene compound. Such ionizing compounds may contain an active proton, or some other cation associated with but not coordinated or only loosely coordinated to the remaining ion of the ionizing compound. Combinations of activators may also be used; see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

The use of ionizing ionic compounds not containing an active proton but capable of producing the both the active metallocene cation and an noncoordinating anion is also known. See, EP-A-0 426 637 and EP-A-0 573 403 (incorporated herein by reference). An additional method of making the ionic catalysts uses ionizing anion pre-cursors which are initially neutral Lewis acids but form the cation and anion upon ionizing reaction with the metallocene compounds, for example the use of tris(pentafluorophenyl) boron. See EP-A-0 520 732 (incorporated herein by reference). Ionic catalysts for addition polymerization can also be prepared by oxidation of the metal centers of transition metal compounds by anion pre-cursors containing metallic oxidizing groups along with the anion groups, see EP-A-0 495 375 (incorporated herein by reference).

Where the metal ligands include halogen moieties (for example, biscyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Support Materials

The metallocene catalyst systems described above are preferably fixed on a support material. For purposes of this patent specification the term "support" is defined as any material upon which metallocenes and/or activators may be fixed. Preferably, the support material is a porous particulate material, such as talc, inorganic oxides, inorganic chlorides and resinous materials such as polyolefin or polymeric compounds. Such materials are generally commercially available.

The preferred support materials are porous inorganic oxide materials, which include those from the Periodic Table of Elements of Groups 2, 3, 4, 5, 13 or 14 metal oxides. Silica, alumina, silica-alumina, and mixtures thereof are most preferred. Other inorganic oxides that may be employed either alone or in combination with the silica, alumina or silica-alumina, are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle diameter in the range of from about 10 to about 500 $\mu$m. More preferably, the surface area is in the range of from about 50 to about 500 $m^2/g$, the pore volume is in the range of from about 0.5 to about 3.5 cc/g and the average particle diameter is in the range of from about 20 to about 200 $\mu$m. Most preferably the surface area is in the range of from about 100 to about 400 $m^2/g$, the pore volume is in the range of from about 0.8 to about 3.0 cc/g and the average particle diameter is in the range of from about 30 to about 100 $\mu$m. The average pore daimeter of typical porous support materials is in the range of from about 10 to about 1000 Å. Preferably, a support material is used that has an average pore diameter of from about 50 to about 500 Å, and most preferably from about 75 to about 350 Å.

Methods of Supporting Metallocene Catalysts

The metallocene, alkylalumoxane and support material may be combined in any manner or order. Examples of suitable support techniques are described in U.S. Pat. Nos. 4,808,561 and 4,701,432 (each fully incorporated herein by reference). Preferably, however, the metallocene and alkylalumoxane are combined first and their reaction product combined with the support material. Suitable examples of this technique are described in U.S. Pat. No. 5,240,894 and WO 94/28034, WO 96/00243, and WO 96/00245 (each fully incorporated herein by reference).

Preferably, a porous support such as silica is used and the volume of metallocene and activator combined with the support is less than about 4.0 times the total pore volume of the support, more preferably less than about 3.0 times the total pore volume of the support, even more preferably less than about 2.5 times the total pore volume of the support.

The procedure for measuring the total pore volume of a porous support is well known in the art. Details of one of these procedures are discussed in Volume 1, *Experimental Methods in Catalytic Research* (Academic Press, 1968) (specifically see pages 67–96). This preferred procedure involves the use of a classical BET apparatus for nitrogen absorption. Another method well know in the art is described in Innes, *Total porosity and Particle Density of Fluid Catalysts By Liquid Titration,* Vol. 28, No. 3, Analytical Chemistry 332–334 (March, 1956).

Regardless of the amount of solution used, it is preferable to combine the support and solution such that the solution is evenly distributed among the support particles. Thus it is preferable to add the solution to the support slowly either as a spray or drop-wise while the support is mixed.

If the catalyst system is supported, it is preferably dried at least to a free flowing powder prior to storage. Heat and/or vacuum may be used to dry the catalyst. Typically, temperature in the range of from about 25° C. to about 100° C. is used for a time period ranging from about 4 to about 36 hours. It may be advantageous to dry the catalyst without vacuum or with a flow of warm inert gas such as nitrogen.

Methods of supporting ionic catalysts comprising metallocene cations and noncoordinating anions are described in WO91/09882, WO 94/03506, WO 96/04319 and in co-pending U.S. Ser. No. 08/248,284, filed Aug. 3, 1994 (incorporated herein by reference). The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

It has been found that the catalyst system components may be selectively positioned on support material particles in order to alter the catalytic behavior of the catalyst system thereby polymerizing olefins in a predetermined manner. In very general terms, this method involves the fixing of a catalyst component such as a metallocene on a particular portion of a support material particle.

The fixing of the catalyst component(s) may be either chemical or physical. Silica, for example, commonly has hydroxyl groups on its surface. These hydroxyl groups, however, can react with metallocenes and/or activators thereby immobilizing or fixing the molecules. The hydroxyl groups may also deactivate these components. Heat or chemical treatment may be used to dehydrate the silica or otherwise remove or neutralize hydroxyl groups. Generally the use of temperatures of from about 100° C. to about 1000° C for about 1 to about 24 hours substantially reduces surface hydroxyl groups. Preferably a temperature of from about 300° C. to about 800° C. is used for up to 24 hours or until about a 3% or less, more preferably a 1% or less, loss on ignition value is obtained. Chemicals such as chlorosilanes, may also be used to dehydrate silica. The loss on ignition value is determined by exposing an amount of the dried support material to 1000° C. for 20 hours and dividing the weight lost by the weight of the support before this treatment and multiplying by 100.

If a non-porous support material is used, the catalyst component(s) can be layered on the surface of the support particle by first exposing the support material to one component then exposing the support material to another component. If the fixation is physical in nature, then it will likely be necessary to dry the support material between component applications. If the fixation is chemical in nature, then drying may be unnecessary. For example, the metallocene/activator product may react with the hydroxyl groups on the silica surface and become thereby chemically fixed on and/or in the silica.

When porous support materials are used, the volume of catalyst component solution may become critical, particularly when the catalyst component is fixed on and/or in the support physically as opposed to chemically. For example, in order to concentrate metallocene on the interior of the support particles and activator on the exterior of support particles, the following method may be employed. Porous, dehydrated silica is mixed with a volume of metallocene dissolved in toluene. The volume of metallocene is less than 1.5 times the total pore volume of the silica so that the silica either appears dry or slightly damp. In this way, most, if not all, of the metallocene solution is pulled into the pores of the silica via capillary forces. Since capillary forces increase with decreasing pore radius, the narrowest pores are filled first. Next, the silica is dried thoroughly using heat and/or vacuum to remove most or all of the toluene from the pores of the silica.

Finally, a MAO solution is applied to the silica. Again, it is preferable to expose the silica to as little solvent as possible in order to avoid causing the metallocene to migrate out of the silica pores. Again, the silica should be dried to remove the MAO solvent. The MAO also fills the pores from smallest to largest so that the resulting supported catalyst system has a distribution of active sites due to the distribution of activator and metallocene ratios.

There are many possible variations on the theme described above. For example, the silica or other support material may first be exposed to a first metallocene, dried, then exposed to a second, different metallocene. Alternatively, the support material may be exposed to a first metallocene, dried, exposed to a second, different metallocene, then dried an exposed to a third or first metallocene again. Each of these exposures may include more than one metallocene. For instance, the support material may be exposed to a first metallocene, dried, then exposed to a mixture of the first and a second, different metallocene. In each of the above cases the support material may be pre-treated with activator, treated with activator between treatments with metallocene and/or treated with activator after treatment with metallocene. The activator may be mixed with the first metallocene, the second metallocene, or both the first and second metallocenes. As used herein one metallocene is "different" from another if its chemical formula is not exactly the same.

In another embodiment, porous support material is treated with a solution that is not a solvent for the metallocene and/or activator. The amount of solution is less than the total pore volume of the support. After this treatment, the support is not dried but is treated with a first metallocene and/or activator optionally followed by treatment with a second metallocene and/or activator. The effect of the first treatment with the solution that is not a solvent for the metallocene and/or activator is to force the metallocene and/or activator to deposit in the larger pores and/or closer to the surface of the support particle. The effect of this treatment would be to create polyolefin particles that are hollow to some extent.

In the context of preparing isotactic polypropylene, we have found that polypropylene having a broad tacticity distribution may be prepared by using two or more metallocenes that when used alone produce isotactic polypropylene having differing isotacticities. If the two metallocenes are mixed together with MAO and their reaction product applied to silica support, the polymer product may be sticky due to the presence of less isotactic polypropylene on the surface of the resulting polymer particle. These sticky particles agglomerate and form unmanageable chunks.

We have discovered that this problem is alleviated by placing the metallocene which produces the less isotactic polypropylene ("metallocene A") on the interior of the silica particle and layering the metallocene which produces highly isotactic polypropylene ("metallocene B") over metallocene A. This causes the less isotactic, sticky polypropylene to primarily form in the interior of the polymer particle. The exterior of the particle is less sticky and the particles remain separated. This is the first example of "engineering" a supported catalyst in order to effect a polymer modification. Alternatively, two or more metallocene Bs may be selected, particularly those which produce polymer having similar melt flow rate but different melting points.

The selection of metallocenes is based on many factors. The metallocenes should have high activity, be non-fouling, produce isotactic or highly isotactic polypropylene having high molecular weight and low extractables, and a melt flow rate in the range of from about 5 to about 30 dg/min, preferably from about 10 to about 20 dg/min.

As used herein "isotactic polypropylene" means having at least 30% isotactic pentads, preferably at least 50%, more preferably at least 60%, and most preferably at least 80% istotactic pentads (according to analysis by $^{13}$C-NMR) or copolymers of propylene and one or more comonomers of ethylene, aliphatic or alicyclic $C_4$–$C_{20}$ alpha-olefin, or $C_4$–$C_{40}$ 1,n-dienes, wherein the comonomers are present in up to 40 mole %.

In general, metallocenes represented by the formula II above, particularly formulas A and B, will produce highly isotactic polypropylene having high molecular weight. Of these metallocenes, ("metallocene B"), the following are particularly preferred for making highly isotactic polypropylene: rac-dimethylsilanediylbis(2,4-dimethylindenyl)ZrCl$_2$, rac-dimethylsilanediylbis(2,4-dimethyl-4-phenylindenyl)ZrCl$_2$, rac-dimethylsilanediylbis(2-methylindenyl)ZrCl$_2$, rac-dimethylsilanediylbis(2-methyl-4,5-benzoindenyl)ZrCl$_2$, and rac-dimethylsilanediylbis(2-methyl-4,6-diisopropylindenyl)ZrCl$_2$.

The preferred mixed metallocene catalyst system useful for preparing the polymers useful in this invention comprise combinations of metallocene A and/or B, support material and alumoxane. Preferably the metallocenes are combined with alumoxane prior to combination with support material.

An alternative method for preparing a supported metallocene catalyst suitable for polymerizing polypropylene useful for making the fabrics of this invention involves the following steps: (a) combining support material and a first solution comprising a first metallocene; then (b) drying the mixture thereby forming supported first metallocene; then (c) combining the supported first metallocene with a second solution comprising a second metallocene wherein the second metallocene is different from the first; then (d) drying the resulting mixture.

In this alternative method, any support material may be used, however, preferably the support material is porous, at least partially dehydrated silica. It may be particularly desirable to dehydrate the silica at a temperature of from about 100° C. to about 800° C. anywhere from about 1 hour to about 24 hours. Any metallocene (or combination of metallocenes and activator(s)) may be used, however, preferably the first solution is a solution of metallocene A or B and the second is a solution of metallocene B and MAO. The selection of specific metallocenes and activators will depend on the ultimate polymer attributes and product performance desired. Generally B metallocenes produce higher molecular weight, higher tacticity polypropylene compared to A metallocenes. There is enough variation within the B metallocene group to provide many polymer and application attribute variations.

Preferably, the volumes of both the first and second solutions is less than about 4.0 times the total pore volume of the silica, more preferably less than about 3.0 times the total pore volume of the silica, even more preferably less than about 2.5 times the total pore volume of the silica, even more preferably less than about 2.0 times the total pore volume of the silica, and most preferably less than about 1.5 times the total pore volume of the silica.

Preferably the first solution contains metallocene A or B and MAO, preferably A without MAO such that the concentration of A is from about 1.0 to about 0.001 mmol metallocene metal/g support material, more preferably in the range of from about 0.5 to about 0.005 mmol metallocene metal/g support material, and most preferably in the range of from about 0.1 to about 1.01 mmol metallocene/g support material.

Preferably the second solution contains metallocene B and MAO such that the ratio of Al to metallocene metal is in the range of from about 500:1 to 50:1, preferably from about 300:1 to about 100:1.

Preferably the ratio of one metallocene to the other (for example metallocene A to metallocene B) in the final catalyst system is from about 10:90 to about 90:10, even more preferably from about 20:80 to about 60:40, more preferably from about 30:70 to about 60:40, and most preferably from about 40:60 to about 50:50. Preferably the final mole ratio of the aluminum of the alumoxane component to the transition metal of the metallocene component(s) applied to the support is in the range of ratios between about 12:1 to about 800: 1, preferably 20:1 to less than 500:1, and most preferably 50:1 to less than 400:1.

The above presumes that the metallocene activities are similar. If the metallocene activities are considerably different, then this difference should be taken into account when determining how much of each to use.

The silica is dried after application of the first solution and after application of the second solution. Preferably the silica is dried until residual solvent trapped in the pores of the carrier is removed. This results in a free-flowing supported catalyst. Preferably greater than about 90% of all the solvent is removed from the supported catalyst system upon drying, even more preferably about 100% of the solvent is removed from the pores of the support material. Heat and/or vacuum may be used to dry the catalyst. Typically vacuum in the range of from about 0 to about 7 atm and temperature in the range of from about 25° C. to about 100° C. is used for a time period ranging from about 4 to about 36 hours. It may be advantageous to dry the catalyst at ambient temperature without vacuum or with a flow of warm inert gas such as nitrogen to avoid problems associated with migration of catalyst components from their designated positions.

The catalyst systems of this invention may be used directly in polymerization or the catalyst system may be prepolymerized using methods well known in the art. For details regarding prepolymerization, see U.S. Pat. Nos.

4,923,833 and 4,921,825, EP 0 279 863 and EP 0 354 893 each of which is fully incorporated herein by reference. The catalyst systems of this invention may also be combined with one or more additives such as scavengers. Examples of suitable scavenging compounds include triethylaluminum (TEAL), trimethylaluminum (TMAL), tri-isobutylaluminum (TIBAL), tri-n-hexylaluminuim (TNHAL) and the like. The amount of scavenging agent used depends upon the type used as well as the process conditions. Generally, for a scavenging agent such as TEAL, 1–500 ppm may be used, preferably, 2–100 ppm, more preferably 5–25 ppm.

Polymerization Processes

The catalyst systems may be used to polymerize propylene and optionally comonomers in any process including gas, slurry or solution phase or high pressure autoclave processes. (As used herein, unless differentiated, "polymerization" includes copolymerization and "monomer" includes comonomer.) Preferably, a gas or slurry phase process is used, most preferably a bulk liquid propylene polymerization process is used.

In the preferred embodiment, this invention is directed toward the bulk liquid polymerization and copolymerization of propylene or ethylene, particularly propylene, in a slurry or gas phase polymerization process, particularly a slurry polymerization process. Another embodiment involves copolymerization reactions of propylene or ethylene, particularly propylene, with one or more of the alpha-olefin monomers having from 4 to 20 carbon atoms, preferably 4–12 carbon atoms, for example alpha-olefin comonomers of ethylene, butene-1, pentene-1, 4-methylpentene-1, hexene-1, octene-1, decene-1, and cyclic olefins such as styrene, cyclopentene or norbornene. Other suitable monomers include polar vinyl, diolefins such as dienes, for example, 1,3-butadiene, 1,4-hexadiene, norbornadiene or vinylnorbornene, acetylene and aldehyde monomers.

In another embodiment propylene is polymerized with at least two different comonomers to form a terpolymer and the like, the preferred comonomers are a combination of alpha-olefin monomers having 3 to 10 carbon atoms, more preferably 3 to 8 carbon atoms, and/or dienes having 4 to 10 carbon atoms.

Typically in a gas phase polymerization process a continuous cycle is employed where in one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the cycle by a cooling system external to the reactor. The recycle stream is withdrawn from the fluidized bed and recycled back into the reactor. Simultaneously, polymer product is withdrawn from the reactor and new or fresh monomer is added to replace the polymerized monomer. (See for example U.S. Pat. Nos. 4,543,399; 4,588,790; 5,028,670; 5,352,749; 5,405,922, and 5,436,304 all of which are fully incorporated herein by reference.)

A slurry polymerization process generally uses pressures in the range of about 1 to about 500 atmospheres or even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be, for example, an alkane or a cycloalkane. The medium employed should be liquid under the conditions of polymerization and relatively inert. Non-limiting examples of liquid mediums include hexane and isobutane.

Polymer Products

Mixed metallocene isotactic polypropylenes useful for the preparation of the nonwoven fabrics of this invention preferably have a weight average molecular weight (MW) that is in the range of from about 50,000 to about 5,000,000, preferably 100,000 to about 1,000,000, more preferably from about 100,000 to about 250,000. For spunbond applications, these polymers preferably have a melt flow rate (MFR) that is in the range of from about 5 dg/min. to about 200 dg/min., preferably from about 10 dg/min. to about 100 dg/min., even more preferably from about 15 dg/min. to about 60 dg/min., and most preferably from about 20 dg/min. to about 45 dg/min.

Composition distribution breadth index (CDBI) is usually used to determine the distribution of comonomer in a copolymer. CDBI is used herein, however, to measure errors in stereoregulation such as misinsertions and stereoerrors in order to give an indication of tacticity distribution. The polymers of this invention preferably have a CDBI that is in the range of from about 25.0 to about 90.0, even more preferably from about 30.0 to about 85.0, even more preferably from about 35.0 to about 80.0, and most preferably from about 35.0 to about 75.0. The percent solubles in cold xylene of these polymers is less than about 20.0, preferably less than about 15, even more preferably less than about 10, and most preferably less than about 10. The melting point of these polymers is preferably in the range of from about 100.0° C. to about 175° C., preferably from about 120° C. to about 170° C., and most preferably from about 140° C. to about 165° C. The molecular weight distribution (Mw/Mn) of these polymers is preferably in the range of from about 2.0 to about 4, more preferably from about 2.0 to about 2.5, and even more preferably from about 2.0 to about 3.0.

The polymers useful in this invention preferably comprise from about 10 to about 90 weight percent 30 to about 70 weight percent, preferably from about 20 to about 80 weight percent, even more preferably from about 30 to about 70 weight percent of polymer produced from one of the two metallocenes of the catalyst system used to prepare the polymer (based on the total weight of the polymer) used to make the fabric.

The mixed metallocene polypropylenes described above may be blended with one or more different polymers, preferably isotactic polypropylene, prepared with one or more metallocene catalyst systems as described above. If the polymers are prepared with a single metallocene, then they will preferably have a molecular weight distribution of less than 4, preferably less than 3. The polymers may be physically blended using methods well known in the art or the different polymers may be used to make bicomponent strands as described in Reissue Pat. No. 30,955 of U.S. Pat. No. 4,068,036; U.S. Pat. No. 3,423,266; and U.S. Pat. No. 3,595,731. A bicomponent nonwoven fabric is made from polymeric fibers or filaments comprising first and second polymer components which remain distinct. The first and second components are arranged in substantially distinct zones across the cross-section of the strands and extend continuously along the length of the strands.

If the mixed metallocene polymer is physically blended with another polymer, preferably the mixed metallocene polymer makes up at least from about 20 to about 90 weight percent of the total polymer blend, preferably from about 30 to about 80 weight percent, and more preferably from about about 40 to about 70 weight percent of the total polymer blend.

If propylene copolymers are used to make the fabrics of this invention, either as the mixed metallocene polymer component or as another component blended with the mixed metallocene polymer coponent, then the copolymer preferably comprises at least 55 weight percent propylene units, more preferably at least 65 weight percent propylene units, even more preferably at least 75 weight percent propylene units, even more preferably at least 85 weight percent propylene units and most preferably at least 95 weight percent propylene units.

Nonwoven Fabrics

The polymers described are used to prepare the nonwoven fabrics of this invention in any nonwoven fabric making process, including but not limited to, melt blowing, spunbonding, film aperturing, and staple fiber carding. Preferably a spunbonding process is used. The spunbonding process is well known in the art. Generally it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

The fabrics of this invention preferably have an MD strength (lb/in) that is at least 5% greater, preferably 10% greater than conventional fabrics prepared under the same conditions with Ziegler-Natta produced polypropylene or with a single metallocene. Even more preferably the fabrics of this invention preferably have an MD strength (lb/in) that is at least 10%, preferably 20%, greater than conventional fabrics prepared under the same conditions with Ziegler-Natta produced polypropylene or with polypropylene produce with a single metallocene.

The fabric may be prepared with mixed metallocene polypropylene alone, physically blended with other mixed metallocene polypropylene or physically blended with single metallocene polypropylene. Likewise the fabrics of this invention may be prepared with mixed metallocene polypropylene physically blended with conventional Ziegler-Natta produced polymer. If blended, the fabric of this invention is preferably comprised of at least 50% mixed metallocene polypropylene.

With these nonwoven fabrics, manufacturers can maintain the desirable properties of fabrics prepared with metallocene produced polypropylene while increasing fabric strength and potentially increased line speed compared to fabrics made using conventional polymers.

EXAMPLES

MFR is measured by the method of ASTM-1238 condition L. CDBI and percent solubles are determined by Temperature Rising Elution Fractionation (TREF) as described in Wild, et al., *J. Poly. Sci. Ed.,* Vol. 20, p. 441, (1982).

Four different classes of propylene polymer were used to prepare spunbond nonwoven fabrics. Polymer A was produced using a mixed metallocene catalyst system. Polymers B and C are polymer A blended with Polymer D which is a polymer produced with a single metallocene catalyst system (commercially available as Achieve™ 3825 from Exxon Chemical Company). Polymer E is a commercial available (from Exxon Chemical Company) Ziegler-Natta polymerized propylene polymer. Some of the properties of these polymers are reported in Table 1.

The catalyst system used to prepare Polymer A was prepared as follows. In an inert $N_2$ atmosphere 8.0 g of dimethylsilanediyl-bis(2-methyl-4-phenylindenyl) zirconium dichloride was combined with 6.0 g of dimethylsilanediyl-bis(2-methylindenyl) zirconium dichloride and 780 g of 30 wt % methylalumoxane solution in toluene (Albemarle Corporation, Baton Rouge, La.). 860 g of toluene was added to dilute the solution. Separately 939 g MS948 silica (Davison Chemical Division of W. R. Grace, Baltimore, Md.) previously dehydrated to 600° C. in a stream of flowing $N_2$ was charged to the catalyst preparation vessel. With the agitator on the metallocene-aluminoxane solution was added to the silica. After addition of the solution mixing continued for one hour and then vacuum was applied to the vessel. A slight nitrogen purge was added to the bottom of the vessel to aid in removing the volatiles. At the end of drying 1454 g of free flowing solid was obtained. Analysis showed a loading of 8.95 wt % Al and 0.17 wt % Zr with an Al/Zr molar ratio of 180.

The procedure for polymerizing Polymer A was as follows. The polymerization was conducted in a pilot scale continuous, stirred tank, bulk liquid phase polymerization process employing two reactors in series. The reactors were equipped with jackets for removing the heat of polymerization. The reactor temperature was set at 70° C. in the first reactor and 64° C. in the second reactor. The catalyst prepared as described above was fed at a rate of 160 ml/hr of a 2 wt % solution of TEAL in hexane solvent. Propylene was fed at a rate of about 73 kg/hr to the first reactor and about 27.5 kg/hr to the second reactor. Hydrogen was added for molecular weight control at 2200 mppm in the first reactor and 2900 mppm in the second reactor. Residence times were about 2.75 hours in the first reactor and about 2 hours in the second reactor. The production rate of polymer was about 32 kg/hr. The polymer was discharged from the reactors as a granular product having an MFR of about 25–40 dg/min. Evaluation of the intermediate product from the first reactor showed a homopolypropylene with an MFR of 30 dg/min.

Polymers A–E were used to prepare spunbond fabrics using a one meter Reicofil line which is made by Reifenhauser Company. The extruder size was 7 cm with 30:1 length:diameter ratio. There were 3719 die plate holes, each having a diameter of 0.4 mm with L/D=4/1. Table II shows the test results of the nonwoven spunbond fabrics which were produced. In the spunbonding process, continuous fibers are extruded, attenuated by pneumatic or mechanical means, laid on an endless belt, and then bonded to each other, often by a heated calendar roll. An overview of spunbonding may be obtained from Wadsworth, L. C. and Goswami, B. C., Nonwoven Fabrics: Spunbonded and Melt Blown Processes, proceeding Eighth Annual Nonwovens Workshop, Jul. 30–Aug. 3, 1990, sponsored by TANDEC, University of Tennessee, Knoxville.

Spunbond fabrics were prepared from polymers A–E. Four different conditions were used. In conditions 1 and 3, the throughput was 0.2 ghm while in conditions 2 and 4 the throughput was 0.35 ghm. The target basis weights were 20 g/sm for conditions 1 and 2 while the target basis weights were 40 g/sm for conditions 3 and 4.

Polymers A–E were extruded at a die temperature of 210° C. The extruded fibers were quenched with chilled air (approximately 10° C.). Spunbonded webs were made at two different throughputs and two different basis weights. The webs were bonded over a broad range of temperatures (10° F. intervals) to optimize calender temperature for web strength.

Fabric testing was performed according to ASTM standard D5035-90, except that a gage length of 5 inches and a crosshead speed of 5 inches (12.7 cm)/minute were used. Six 1 inch (2.54 cm) wide strips of fabric were cut in both the machine direction (MD) and cross direction (CD) of the spunbond web for testing. Fabric failure was defined as the point at which the tensile force dropped to 90% of the peak load. The maximum load and the elongation to break were measured for both the MD and CD.

Diameters of the fibers in the web were determined using a calibrated microscope. Twenty-five diameter measurements were made on each web and the average value and standard deviation were reported. The fiber diameters of the mixed metallocene resin were similar to those of the control samples indicating that spinning speeds were approximately the same for all resins used.

As can be seen in Table II, the spun bonded webs made from the mixed metallocene resin, Polymer A, shows significantly improved MD tensile strength and elongation at all four Conditions compared to the control resins, Polymers D and E. The CD tensile of the web made from Polymer A at Condition 1 is also superior to the conventional material, Polymer D and Polymer E, at Condition 1. The elongation of Polymer A is also higher than polymers D and E at conditons 1, 3, and 4.

The spun bonded webs made from the mixed metallocene/single metallocene blend, Polymer B, also shows improved MD strength and elongation at Conditions 2, 3, and 4 compared to the control samples at Conditions 2–4.

TABLE 1

| Polymer | Description | MFR[a] | Compliance[b] | MWD[c] |
|---|---|---|---|---|
| A | Mixed MCN | 37 | 0.90 | 2.78 |
| B | 50% Mixed MCN[d] 50% Polymer D | 34 | 0.69 | 2.21 |
| C | 25% Mixed MCN[e] 75% Polymer D | 33 | 0.54 | 1.96 |
| D | Single Metallocene | 36 | 0.28 | 1.89 |
| E | Ziegler-Natta | 35 | 0.90 | ≈2.5[f] |

[a] pelletized material
[b] xE−5
[c] as measured by GPC
[d] MFR of 26–28
[e] MFR of 25–26
[f] after peroxide treatment

TABLE II

| Polymer | Throughput (ghm) | B. W. g/sm | Bond Temp (F.) | MD[a] Peak Load (lb/in) | MD Norm Load (lb/in) | MD Break Elong. (%) | CD Peak Load (lb/in) | CD Norm Load (lb/in) | CD Break Elong (%) | Fiber Diam (μ) |
|---|---|---|---|---|---|---|---|---|---|---|
| Condition 1 | | | | | | | | | | |
| A | .20 | 20.4 | 270 | 7.5 | 7.4 | 120 | 3.7 | 3.7 | 108 | 21.7 |
| B | .20 | 23.1 | 260 | 6.4 | 5.6 | 115 | 3.5 | 3.1 | 110 | 21.6 |
| C | .20 | 22.3 | 260 | 6.4 | 5.7 | 115 | 3.1 | 2.7 | 96 | 22.5 |
| D | .20 | 20.1 | 270 | 6.3 | 6.3 | 90 | 3.2 | 3.2 | 85 | 21.1 |
| E | .20 | 21.3 | 280 | 5.8 | 5.5 | 98 | 3.2 | 3.0 | 88 | 21.4 |
| Condition 2 | | | | | | | | | | |
| A | .35 | 21.2 | 260 | 4.8 | 4.5 | 137 | 2.7 | 2.6 | 126 | 26.9 |
| B | .35 | 21.0 | 260 | 4.7 | 4.5 | 148 | 2.2 | 2.1 | 124 | 27.5 |
| C | .35 | 21.1 | 260 | 4.4 | 4.1 | 140 | 2.3 | 2.2 | 132 | 28.7 |
| D | .35 | 21.0 | 260 | 4.4 | 4.2 | 122 | 2.7 | 2.6 | 130 | 26.5 |
| E | .35 | 21.3 | 270 | 4.1 | 3.8 | 120 | 2.5 | 2.3 | 113 | — |

[a] Normalized to target basis weight.

| Polymer | Throughput (ghm) | B. W. g/sm | Bond Temp (F.) | MD Peak Load (lb/in) | MD Norm Load (lb/in) | MD Break Elong. (%) | CD Peak Load (lb/in) | CD Norm Load (lb/in) | CD Break Elong (%) | Fiber Diam (μ) |
|---|---|---|---|---|---|---|---|---|---|---|
| Condition 3 | | | | | | | | | | |
| A | .20 | 43.5 | 280 | 15.8 | 14.5 | 135 | 9.0 | 8.3 | 138 | 23.0 |
| B | .20 | 43.3 | 280 | 17.6 | 16.3 | 137 | 8.2 | 7.5 | 125 | 22.3 |
| C | .20 | 42.9 | 270 | 14.0 | 13.0 | 129 | 7.6 | 7.1 | 126 | 22.9 |
| D | .20 | 44.0 | 280 | 13.7 | 12.5 | 99 | 8.5 | 7.7 | 109 | 21.4 |
| E | .20 | 40.0 | 290 | 13.6 | 13.6 | 119 | 8.7 | 8.7 | 121 | 21.5 |
| Condition 4 | | | | | | | | | | |
| A | .35 | 43.5 | 270 | 11.1 | 10.2 | 159 | 5.8 | 5.3 | 148 | 28.1 |
| B | .35 | 39.9 | 270 | 10.3 | 10.3 | 167 | 5.0 | 5.0 | 136 | 27.2 |
| C | .35 | 41.3 | 280 | 9.4 | 9.1 | 123 | 4.9 | 4.8 | 125 | 29.0 |
| D | .35 | 43.5 | 270 | 9.3 | 8.6 | 137 | 6.2 | 5.7 | 130 | 27.0 |
| E | .35 | 42.6 | 280 | 10.1 | 9.5 | 144 | 6.6 | 6.2 | 143 | 28.4 |

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the appendant claims have single appendencies in accordance with U.S. patent practice, each of the features in any of the appendant claims can be combined with each of the features of other appendant claims or the main claim.

We claim:

1. A nonwoven fabric comprising polymeric strands comprising a polymeric component comprising polypropylene having at least 30% isotactic pentads wherein the polypropylene has been produced with a catalyst system comprising two metallocenes at least one of which is represented by the formula:

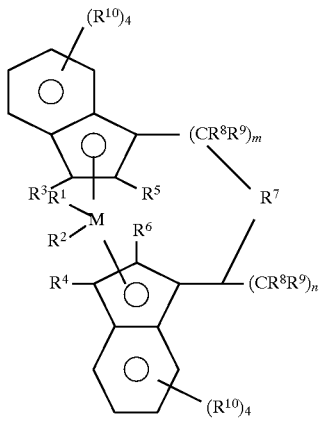

wherein M is selected from the group consisting of titanium, zirconium, hafnium, vanadium niobium, tantalum, chromium, molybdenum and tungsten;

$R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$ arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

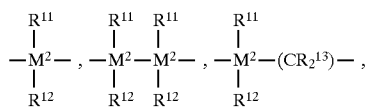

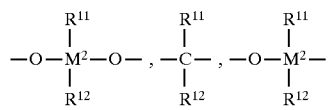

—B($R^{11}$)—, —Al($R^{11}$)—, —Ge—, —Sn—, —O—, —S—, —SO—, —$SO_2$—, —N($R^{11}$)—, —CO—, —P($R^{11}$)—, or —P(O)($R^{11}$)—; wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals can be joined together to form a ring system.

2. The fabric of claim 1 wherein the polymeric component has a molecular weight distribution in the range of from about 2.0 to about 4.

3. The fabric of claim 1 wherein the polymeric component has a molecular weight distribution in the range of from about 2.0 to about 2.5.

4. The fabric of claim 1 wherein the fabric is prepared using a spunbonding process.

5. The fabric of claim 1 wherein the polypropylene is a homopolymer.

6. The fabric of claim 1 wherein both metallocenes are each independently represented by the following formula:

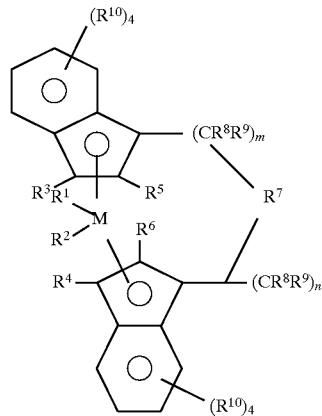

wherein M is selected from the group consisting of titanium, zirconium, hafnium, vanadium niobium, tantalum, chromium, molybdenum and tungsten;

$R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

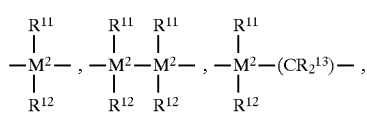

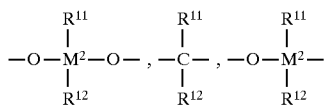

—B($R^{11}$)—, —Al($R^{11}$)—, —Ge—, —Sn—, —O—, —S—, —SO—, —$SO_2$—, —N($R^{11}$)—, —CO—, —P($R^{11}$)—, or —P(O)($R^{11}$)—;

wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals can be joined together to form a ring system.

7. The fabric of claim 1 wherein at least one of the metallocenes is represented by one of the following formulas:

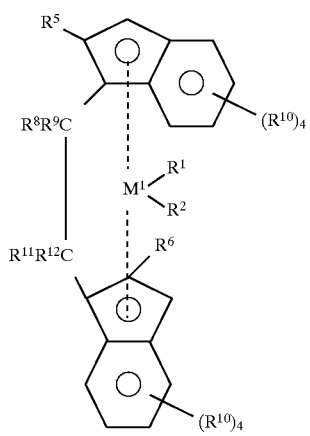

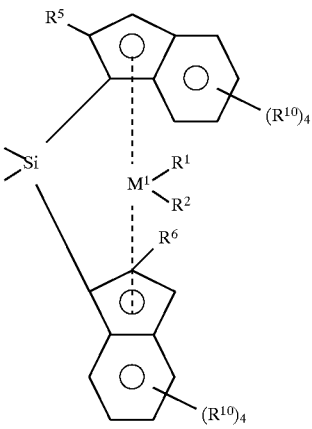

wherein:

$M^1$ is Zr or Hf, $R^1$ and $R^2$ are methyl or chlorine, and $R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^{11}$ and $R^{12}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$ together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radical $R^{10}$ has the meanings stated for $R^{11}$ and $R^{12}$ and two adjacent $R^{10}$ radicals can be joined together to form a ring system.

8. The fabric of claim 1 wherein the polymeric component comprises from about 30 to about 70 weight percent polymer produced from one of the two metallocenes based on the total weight of the polymeric component.

9. The fabric of claim 1 wherein the polypropylene has at least 60% isotactic pentads.

10. The fabric of claim 1 wherein the polypropylene has at least 80% isotactic pentads.

11. A nonwoven fabric consisting essentially of polypropylene having at least 80% isotactic pentads and a molecular weight distribution in the range of from about 2.0 to about 4.0 and wherein the polypropylene has been produced with a catalyst system comprising two metallocenes each independently represented by the formula:

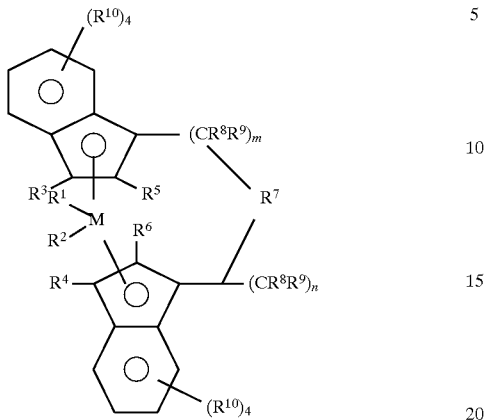

wherein M is selected from the group consisting of titanium, zirconium, hafnium, vanadium niobium, tantalum, chromium, molybdenum and tungsten;

$R^1$ and $R^2$ are identical or different, are one of a hydrogen atom, a $C_1$–$C_{10}$ alkyl group, a $C_1$–$C_{10}$ alkoxy group, a $C_6$–$C_{10}$ aryl group, a $C_6$–$C_{10}$ aryloxy group, a $C_2$–$C_{10}$ alkenyl group, a $C_2$–$C_4$ alkenyl group, a $C_7$–$C_{40}$ arylalkyl group, a $C_7$–$C_{40}$ alkylaryl group, a $C_8$–$C_{40}$ arylalkenyl group, or a halogen atom;

$R^3$ and $R^4$ are hydrogen atoms;

$R^5$ and $R^6$ are identical or different, and are one of a halogen atom, a $C_1$–$C_{10}$ alkyl group which may be halogenated, a $C_6$–$C_{10}$ aryl group which may be halogenated, a $C_2$–$C_{10}$ alkenyl group, a $C_7$–$C_{40}$-arylalkyl group, a $C_7$–$C_{40}$ alkylaryl group, a $C_8$–$C_{40}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, a $C_1$–$C_{10}$ alkyl group, or a $C_6$–$C_{10}$ aryl group;

$R^7$ is

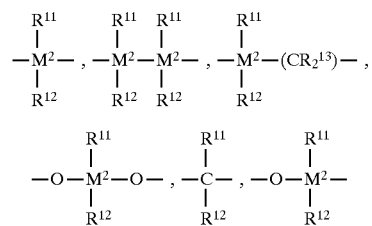

—$B(R^{11})$—, —$Al(R^{11})$—, —Ge—, —Sn—, —O—, —S—, —SO—, —$SO_2$—, —$N(R^{11})$—, —CO—, —$P(R^{11})$—, or —$P(O)(R^{11})$— wherein:

$R^{11}$, $R^{12}$ and $R^{13}$ are identical or different and are a hydrogen atom, a halogen atom, a $C_1$–$C_{20}$ alkyl group, a $C_1$–$C_{20}$ fluoroalkyl group, a $C_6$–$C_{30}$ aryl group, a $C_6$–$C_{30}$ fluoroaryl group, a $C_1$–$C_{20}$ alkoxy group, a $C_2$–$C_{20}$ alkenyl group, a $C_7$–$C_{40}$ arylalkyl group, a $C_8$–$C_{40}$ arylalkenyl group, a $C_7$–$C_{40}$ alkylaryl group, or $R^{11}$ and $R^{12}$, or $R^{11}$ and $R^{13}$, together with the atoms binding them, can form ring systems;

$M^2$ is silicon, germanium or tin;

$R^8$ and $R^9$ are identical or different and have the meanings stated for $R^{11}$;

m and n are identical or different and are zero, 1 or 2, m plus n being zero, 1 or 2; and the radicals $R^{10}$ are identical or different and have the meanings stated for $R^{11}$, $R^{12}$ and $R^{13}$ and two adjacent $R^{10}$ radicals can be joined together to form a ring system.

* * * * *